July 15, 1969 T. B. BURNETT ET AL 3,456,129
PULSE GENERATOR CIRCUIT PROVIDING PULSE REPETITION RATE PROPORTIONAL TO AMPLITUDE OF ALTERNATING SIGNAL
Filed May 6, 1966 2 Sheets-Sheet 1

Thomas B. Burnett
David A. Ball
INVENTORS

Misegades & Douglas
ATTORNEYS

Thomas B. Burnett
David A. Ball
INVENTORS

Miegadas & Douglas
ATTORNEYS

United States Patent Office 3,456,129

Patented July 15, 1969

3,456,129

PULSE GENERATOR CIRCUIT PROVIDING PULSE REPETITION RATE PROPORTIONAL TO AMPLITUDE OF ALTERNATING SIGNAL

Thomas Brian Burnett and David Alan Ball, Stafford, England, assignors to The English Electric Company, Limited, London, England, a British company Filed May 6, 1966, Ser. No. 548,204
Claims priority, application Great Britain, May 14, 1965, 20,475/65
Int. Cl. H03k *5/153*
U.S. Cl. 307—261 9 Claims

ABSTRACT OF THE DISCLOSURE

This invention relates to a pulse generator for producing pulses having a repetition rate proportional to the amplitude of an alternating signal. In particular, there is provided a main storage capacitor which is charged by a rectified A.C. signal, a transistorized switching circuit being connected across this capacitor which circuit discharges the capacitor upon the voltage across it rising to an upper limiting value and permitting it to re-charge to this value when its voltage has fallen to a lower limiting value. In this way a pulsating signal is developed at the output.

This invention relates to pulse generators, and particularly, but not exclusively, relates to pulse generators for use in a system of the type described in our British Patent No. 1,081,576.

From one aspect, this invention consists in a pulse generator circuit for producing pulses having a repetition rate proportional to an instantaneous value of an alternating signal, comprising means for rectifying said alternating signal, means for applying the rectified signals across a charge storage device, and a switching circuit for discharging said device upon the voltage across the device attaining an upper limiting value and permitting said device to recharge to said value when the voltage across the device has fallen to a lower limiting value so that a pulsating signal is developed at the output of the switching circuit.

In order that this invention can be fully understood, some embodiments thereof will now be described with reference to the accompanying drawings, in which.

Figure 1:
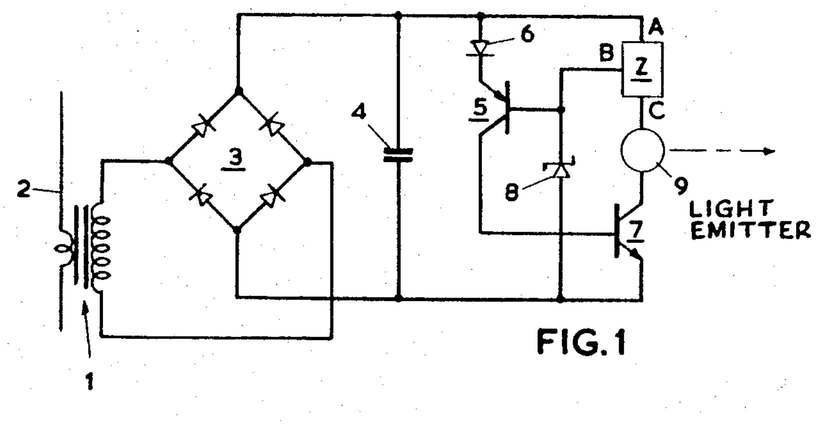
FIG. 1 illustrates one form of pulse generator circuit according to this invention and which is employed in a system of the type mentioned above for receiving full-wave rectified alternating signals from a high voltage line.

Referring now to FIG. 1, there is shown a current transformer 1 which is coupled to a high voltage conductor 2. This transformer has only low voltage insulation and transforms the line current to a lower value. A full-wave bridge rectifier 3 has its A.C. terminals connected across the secondary of this transformer and its D.C. terminals are connected across the pulse generator proper. In particular, this pulse generator comprises a capacitor 4 connected across the D.C. terminals of the rectifier, and a p-n-p transistor 5 having its emitter connected to the positive D.C. supply through a rectifier 6, its collector connected to the base of an n-p-n transistor 7, and its base connected through a Zener diode 8 to the negative line of the D.C. supply, the emitter of transistor 7 also being connected to this line. A three terminal impedance network Z has a terminal A connected to the positive supply, a terminal B connected to the base of transistor 5 and a terminal C connected to the collector of transistor 7 through a light-emitter 9, e.g. a gallium arsenide or gallium phosphide diode.

In operation, the transistors are arranged to turn-on when the voltage developed across the capacitor 4 reaches a predetermined value, thus discharging this capacitor. The Zener diode 8 determines this discharge value and the current pulse produced upon discharge activates the light-emitter 9. When the discharge current falls to a predetermined low value, the transistors are effectively turned-off, thus allowing the capacitor 4 to re-charge.

The impedance network Z controls the range of operation of the switch and is described in more detail below.

The pulse generator described with reference to FIG. 1 generates pulses having a pulse rate or repetition frequency proportional to the instantaneous value of a full wave rectified alternating current. The pulse generator shown in FIG. 2 however, generates separate pulses having repetition frequencies proportional to the positive and negative half cycles of alternating current.

Figure 2:
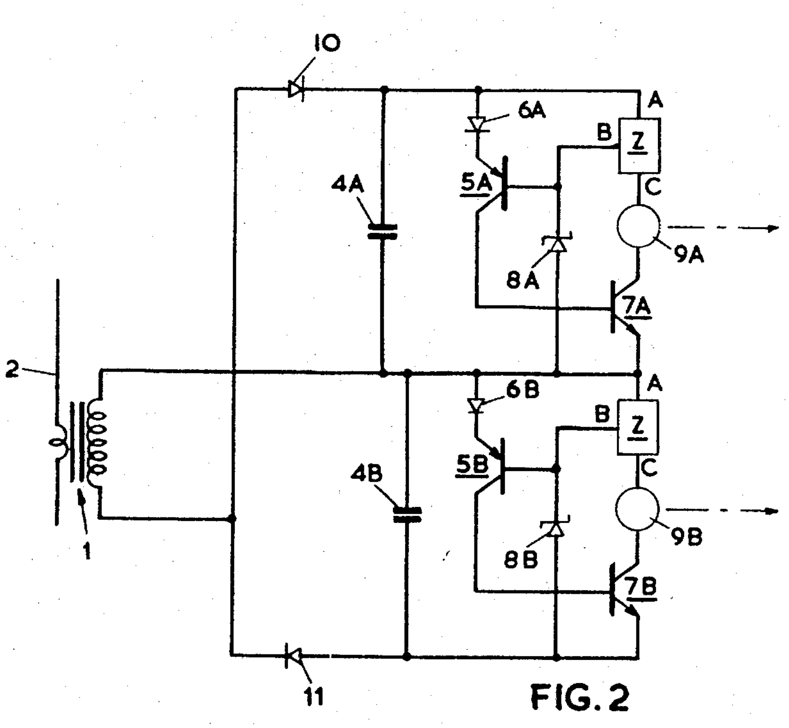
FIG. 2 illustrates a pulse generator circuit which includes two pulse generators of the type shown in FIG. 1 but which are responsive to alternate half cycles of an alternating signal.

In particular, FIG. 2 comprises two pulse generators of the type shown in FIG. 1 and those components which are identical to the corresponding components shown in FIG. 1 have been similarly referenced in FIG. 2, except for the addition of an identifying suffix "A" and "B."

The operation of each of the two generator circuits in this pulse generator is identical to that described above with reference to FIG. 1, except that the capacitors 4A and 4B are charged by half-wave positive and negative signals, respectively, which have been rectified by rectifiers 10 and 11.

Figure 3:
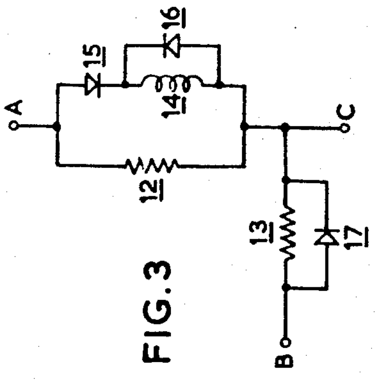
FIG. 3 illustrates a details of one form of impedance network employed in the pulse generators shown in FIGS. 1 and 2.

One form of impedance network Z employed in the above figures is shown in FIG. 3.

Referring to this latter figure, the network comprises two series-connected resistors 12 and 13 which bridge the emitter-base junction of transistor 5 and develop the voltage across this junction necessary to switch-on this transistor at some defined minimum charging current. An inductor 14 and a diode 15 are together connected across the resistor 12 to define a nonlinear resistance, and a diode 16 is connected across the inductor 14 to limit the reverse voltage developed across it. Further, a diode 17 is connected across the resistor 13. This diode being forward biased when the switch is "on" thus shunting resistor 13 and reducing the overall resistance of the switch, and assisting the rapidity with which it is turned "on."

Figure 4:
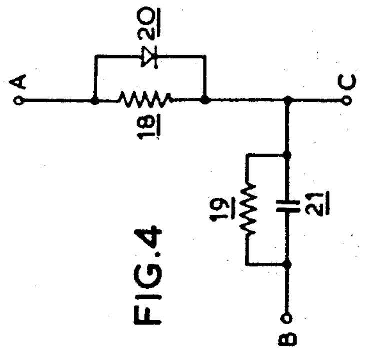
FIG. 4 illustrates details of an alternative form of impedance network employed in the pulse generators shown in FIGS. 1 and 2.

Referring now to FIG. 4 there is shown an alternative form of impedance network. This network comprises two series connected resistors 18 and 19 with a diode 20 connected across the resistor 18 and a capacitor 21 connected across the resistor 19.

The resistor 18 and diode 20 together constitute a non-linear impedance as in the previous and present a high impedance to transistor 7 when it initially turns-on, that is, before the diode conducts, thus enabling the high loop gain to be achieved, at this instant. When the transistor is fully conducting however, there is only low voltage drop across this branch because the diode 20 now has only a small impedance at the operating current. This reduction in the voltage drop is necessary, otherwise capacitor 21, which effectively bridges diode 20 when transistor 5 is conducting, will never discharge to a voltage low enough to switch this transistor "off."

The capacitor 21 and its resistor 19 together constitute a non-linear resistance in a manner similar to the diode-resistor combination and tend to compensate for non-linearities in the operating characteristics.

Linearity further improved by inserting a low capacitance diode in series with the Zener diode. This reduces the leakage current during charging since without this additional diode, at low charging currents the leakage current through the self-capacitance of the Zener diode is comparable to the charging current and thus affects the linaerity. This diode also eliminates the discharge of the Zener capacitance through transistor 7 when this is conducting.

The circuit shown in FIG. 4 thus permits satisfactory operation of the pulse generator with much lower charging currents than are possible with the circuit shown in FIG. 3, principally because of the reduction in the leakage current through the Zener diode. The lower limit of operation of this pulse generator is in fact set by the loop gain of the circuit, and this can be further improved by omitting the diode 6.

However, by employing the circuit shown in FIG. 4 with either of the embodiments shown in FIG. 1 or FIG. 2, the precise levels at which the transistor switch turns-on and turns-off are temperature dependent principally because, on the one hand, the Zener voltage of diode 8 and the base-emitter turn-on voltage of transistor 5 vary with temperature and, on the other hand, the voltages across the collector and emitter of transistor 7 and across the light-emitter 9 vary with temperature, thus affecting the charging time of capacitor 21.

Figure 5:
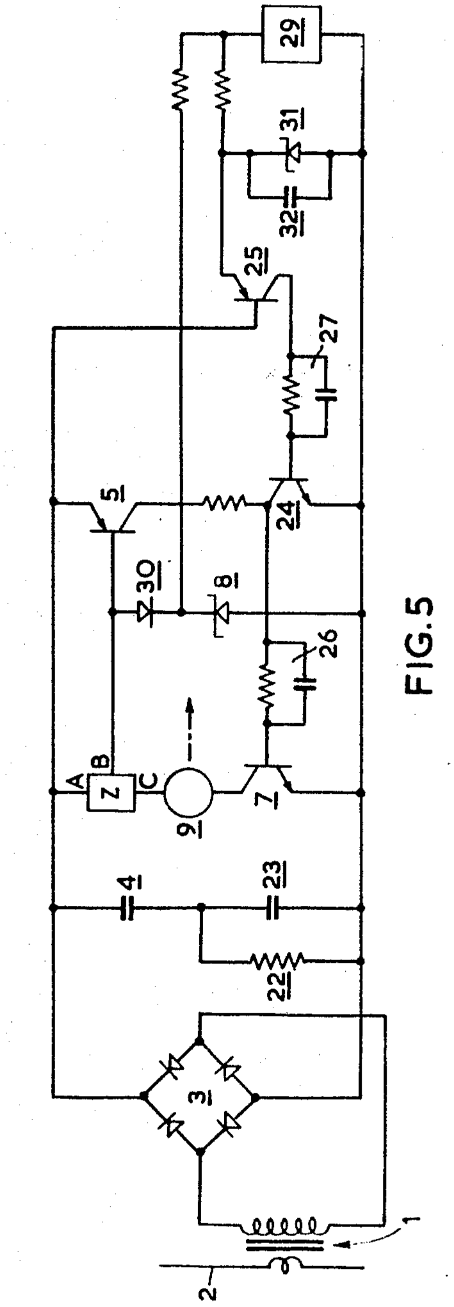
FIG. 5 illustrates a modification of the circuit shown in FIG. 1.

In order to improve this circuit, FIG. 1 may be modified as shown in FIG. 5, the impedance network Z being as shown in FIG. 4 except for the omission of the resistor 19 which is no longer required to compensate for non-linearity.

Referring now to FIG. 5, the components therein which are the same as those in FIG. 1 have been similarly referenced. Additionally, however, this circuit includes a parallel-connected resistor 22 and capacitor 23 in series with the capacitor 4, which compensates for non-linearities at high frequencies when the discharge time of the circuit becomes comparable with the charging time, a defined turn-off voltage network including two complementary transistors 24 and 25, and two parallel RC networks 26 and 27 for speeding-up the turn-off time of transistors 7 and 24, respectively.

More particularly, this network includes an auxiliary D.C. source 29 across which is connected the Zener diode 8, a diode 30 being connected between this Zener diode and the base of transistor 5, and this source 29 also supplies the emitter of transistor 25. A Zener diode 31, having a capacitor 32 connected thereacross, is also connected to the emitter of this transistor 25, Zener diode 31 having a lower Zener voltage than that of diode 8.

In operation, the current through the Zener diode 8 is adjusted so that its temperature coefficient balances that of the transistor 5, thereby eliminating any error in turn-on voltage of this transistor with changes in temperature.

During the major portion of the charging time of capacitor 4, the diode 30 is cut-off, thus maintaining linearity, and when the emitter potential of transistor 5 rises above the base potential, transistor 5, and thus transistor 7, turn-on, and the capacitor 4 discharges. Subsequently, when the emitter potential of transistor 5, and thus the base potential of transistor 25, falls below the reference level set by the Zener diode 31, the complementary transistors 25 and 24 turn-on, thus turning-off transistor 7 and arresting the discharge of capacitor 4.

As before, the current through Zener diode 31 is adjusted so that its temperature coefficient balances that of the transistor 25, so as to make the turn-off voltage independent of temperature changes, and since this transistor is p-n-p type no leakage current is drawn during the charging time and linearity is maintained.

The capacitor 4 is thus constrained to charge-up linearly between two voltage levels which are independent of temperature.

The pulse generators described above are capable of giving a pulse rate accurately proportional to the charging current of the capacitor 4 over a very wide range and, in the system with which it is described, it does not require a separate power supply, which can be a considerable advantage, even the D.C. source 29 in FIG. 5 being developed from the line supply.

With regard to this latter point it is to be understood that a pulse generator according to this invention is not restricted to use with such a system, and a different form of input supply could readily be adopted as also could the mode of output, i.e. it is not necessary to provide a pulsating light output as has been described.

We claim:

1. A pulse generator circuit for producing pulses having a repetition rate proportional to the amplitude of an alternating signal, comprising
- a rectifier for rectifying said alternating signal,
- a charge storage device for receiving the rectified signals, and
- a switching circuit for discharging said device upon the voltage across the device attaining an upper limiting value and permitting said device to re-charge when the voltage across said device has fallen to a lower limiting value so that a pulsating signal is developed at the output of the switching circuit, said switching circuit comprising
  - first and second complementary transistors connected in cascade, so that the output of the first transistor constitutes the input to the second,
  - a voltage limiter connected to the said first transistor which accurately determines the potential at which this first transistor turns-on at the said upper limiting value for effecting discharge of the capacitor, and
  - a load connected to the second transistor and across which the said pulsating signal is developed.

2. A pulse generator according to claim 1, wherein said load includes a three terminal impedance network, one branch of the network being connected to said first transistor to effect turn-off thereof at the said lower limiting value.

3. A pulse generator according to claim 2, wherein a capacitor is connected in said branch to turn-off said first transistor.

4. A pulse generator according to claim 1 comprising
- an auxiliary source of direct voltage connected across said voltage limiter whereby the quiescent current through said voltage limiter is adjustable such that the temperature coefficient of said limiter matches the temperature coefficient of the said first transistor.

5. A pulse generator according to claim 4, comprising
- two further complementary transistors connected in cascade so that the output of one transistor constitutes the input to the other transistor, said other transistor having connected thereto
- a load including the said first transistor, and the one transistor having connected thereto
  - a further voltage limiter which accurately determines the potential at which the other transistor turns-on at said lower limiting value, the turning-on of said other transistor causing the said first transistor to turn-off and arrest the discharge of said storage device.

6. A pulse generator according to claim 5, wehrein the load includes
- an emissive device energisable by said pulsating signal to emit light pulses.

7. A pulse generator comprising
- two said circuits as claimed in claim 3, the two circuits being connected to a common alternating signal and the rectifying means for each circuit being effective for only half-wave rectification whereby one circuit receives positive half-waves of said signal and the other circuit receives negative half-waves of said signal.

8. A pulse generator circuit adapted to produce pulses having a repetition rate proportional to an instantaneous value of an alternating signal, comprising rectifier means for rectifying said alternating signal, a charge storage device for receiving the rectified signals, a switching circuit for discharging said device upon the voltage across the device attaining an upper limiting value and permitting said device to recharge when the voltage across the device has fallen to a lower limiting value, said switching circuit comprising a first pair of complementary transistors connected with the output of one transistor constituting the input to the other transistor, said one transistor having connected thereto a first voltage limiter which accurately determines the turn-on potential of said one transistor at the upper limiting value for effecting discharge of the charge storage device, and the other transistor having connected thereto a load which is energisable in a pulsating manner corresponding to the charge and discharge periods of said charge storage device, and a second pair of complementary transistors connected with the output of one transistor constituting the input to the other transistor, said other transistor of the second pair having connected thereto a load including the said one transistor of the first pair, and the said one transistor of the second pair having connected thereto a second voltage limiter which accurately determines the turn-on potential of the other transistor of the second pair at said lower limiting value, the turning-on of this other transistor causing the said one transistor of the first pair to turn-off and arrest the discharge of said storage device.

9. A pulse generator according to claim 8, comprising an auxiliary source of direct voltage, and means connecting said auxiliary source across said first voltage limiter whereby the quiescent current through said first voltage limiter is adjustable such that the temperature coefficient of said first voltage limiter matches the temperature coefficient of the said one transistor of the first pair.

References Cited

UNITED STATES PATENTS

| | | | |
|---|---|---|---|
| 3,209,212 | 9/1965 | Billings | 307—233 XR |
| 3,280,368 | 10/1966 | Ahmed et al. | 307—301 XR |
| 3,281,639 | 10/1966 | Potter et al. | 307—235 XR |

ARTHUR GAUSS, Primary Examiner

JOHN ZAZWORSKY, Assistant Examiner

U.S. Cl. X.R.

307—235, 255, 271, 313; 315—241